Figure 1:
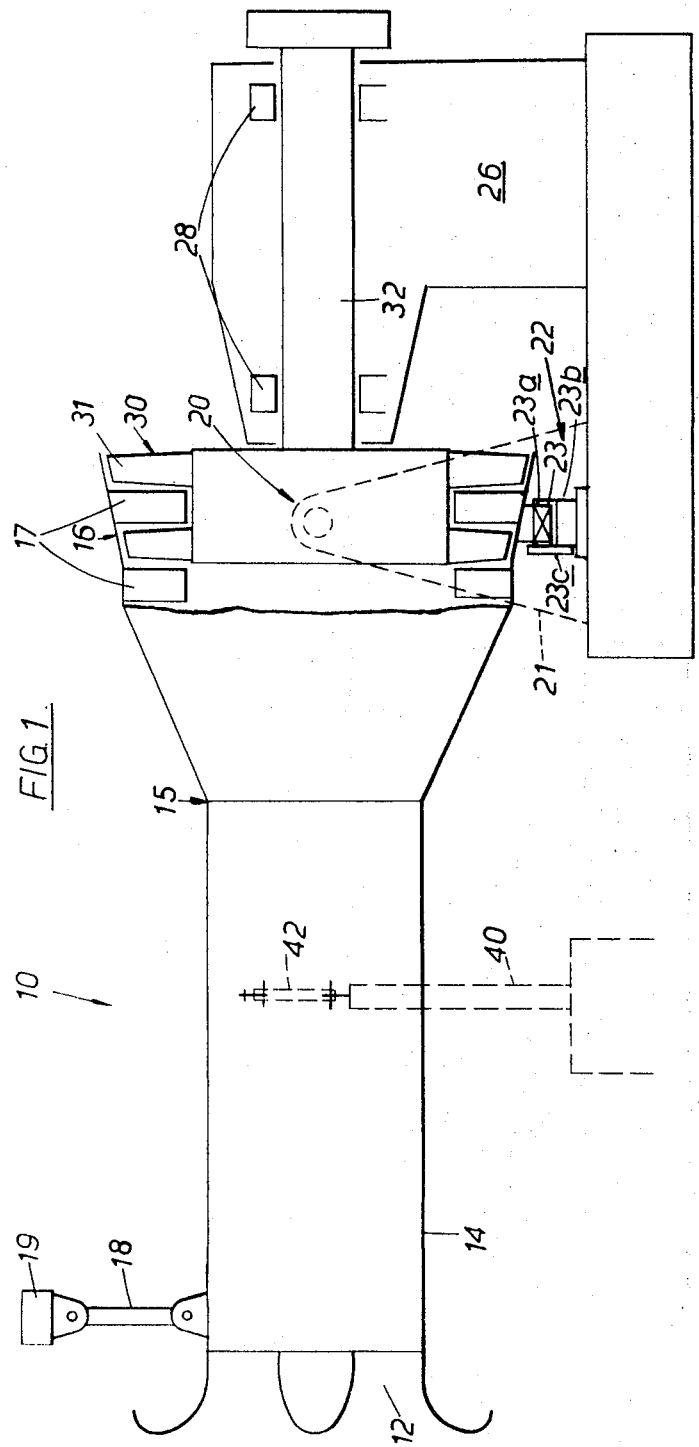

United States Patent [19]
Carr

[11] 3,837,164
[45] Sept. 24, 1974

[54] INDUSTRIAL GAS TURBINE POWER PLANT MOUNTING APPARATUS

[75] Inventor: William Reginald Carr, Rugby, England

[73] Assignee: Rolls-Royce (1971) Limited, London, England

[22] Filed: May 21, 1973

[21] Appl. No.: 362,058

[30] Foreign Application Priority Data
May 24, 1972 Great Britain.................... 24328/72

[52] U.S. Cl........... 60/39.16 R, 60/39.31, 60/39.32, 415/170 R, 415/209
[51] Int. Cl. ............................................ F02c 3/10
[58] Field of Search..... 60/39.31, 39.16 R, 39.16 C, 60/39.32, 39.17; 416/171, 124; 415/209, 134, 138, 126, 128, 170 R, 60, 68; 417/407, 423, 360; 248/DIG. 1, 54 R, 15

[56] References Cited
UNITED STATES PATENTS

| | | | |
|---|---|---|---|
| 2,585,576 | 2/1952 | Nicolen............................ | 60/39.31 |
| 2,632,997 | 3/1953 | Howard et al. .................... | 60/39.31 |
| 2,936,978 | 5/1960 | Lauck............................... | 60/39.31 |
| 2,968,922 | 1/1961 | Gilbert............................. | 60/39.31 |
| 2,971,334 | 2/1961 | Carlson........................... | 60/39.16 R |
| 3,241,314 | 3/1966 | Fields.............................. | 60/39.31 |
| 3,273,654 | 9/1966 | Pinnes............................. | 416/171 |
| 3,556,672 | 1/1971 | Gentile ............................ | 60/39.31 |
| 3,366,365 | 1/1968 | Rizk ............................... | 415/138 |

Primary Examiner—Carlton R. Croyle
Assistant Examiner—O. T. Sessions
Attorney, Agent, or Firm—Cushman, Darby & Cushman

[57] ABSTRACT

An industrial gas tubine power plant consists of a gas generator having a compressor, combustion equipment and a compressor driving turbine, and a power turbine. The stator casing of the power turbine is attached to the gas generator and the rotor portion of the power turbine is mounted independently in an overhung manner in a pedestal. The gas generator is mounted at the rear on a pair of trunnions on the stator casing and at the front either by a link attached to an overhead frame or a pair of links from a column on each side of the gas generator. The gas generator also has a central locating device mounted under the stator casing to centralise radial expansion of the stator casing.

3 Claims, 2 Drawing Figures

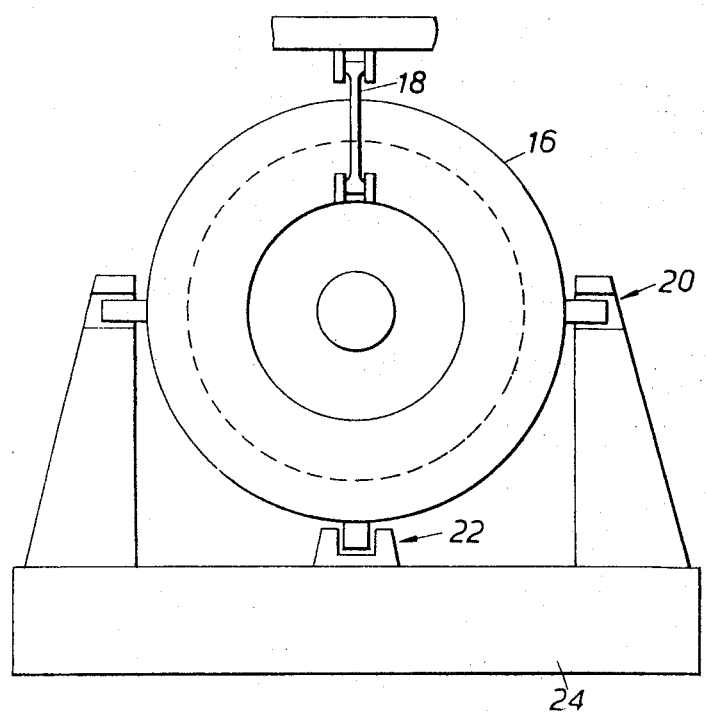

INDUSTRIAL GAS TURBINE POWER PLANT MOUNTING APPARATUS

This invention relates to mounting apparatus for stationary gas turbine power plants such as are used in industrial and marine applications.

The present invention provides a gas turbine power plant including a gas generator and a power turbine, the stator portion of the power turbine being secured to the gas generator and the rotatable portion of the power turbine being mounted independently of the gas generator.

Preferably the gas generator is mounted at its downstream end, for rotation about a horizontal axis which extends transversely and intercepts the horizontal axis of the gas generator.

The gas generator may be mounted for rotation on a pair of trunnions, one being placed on each side of the stator portion of the power turbine, the upstream end of the gas generator being mounted on a movable support.

The stator portion of the power turbine may have a central locating means which consists of a tongue fixed to the power turbine stator casing slidable in a slot. A stop may be provided at either one or both ends of the slot.

The upstream gas generator support may comprise a link pivotally attached at one end to the gas generator and at the other end to a suitable supporting structure. Alternatively, the upstream support may comprise a pair of columns, one on each side of the gas generator and an arm pivotally attached at each end between the gas generator and each column.

The rotatable portion of the power turbine may be mounted in an overhung position on a pedestal secured to the ground.

The present invention will now be more particularly described with reference to the accompanying drawings in which:

FIG. 1 shows a diagrammatic side elevation of one form of gas turbine power plant mounted apparatus according to the prevent invention, and FIG. 2 is a front elevation of the power plant shown in FIG. 1.

Referring to the FIGS., a gas generator 10 includes an air intake 12, compressor means, combustion means and compressor driving turbine means (all not shown) contained within a casing 14. A power turbine stator casing 16 having blades 17 is attached to the casing 14 at a break point 15.

The gas generator is supported at its upstream end by a link 18 which is pivotally secured at one end to the gas generator and at the other end to a suitable supporting structure 19 e.g., a roof truss or a portal frame.

The downstream end of the gas generator is mounted on a trunnion 20, the axis of which extends transversely of and intercepts the longitudinal axis of the gas generator, the trunnion 20 being attached to the stator casing 16. The trunnion supports 21 are attached to a base 24.

A central locating means 22 is attached to the casing 16 in the plane of the vertical centre-line of the casing 16 and consists of a tongue 23 which is movable in a slot 23a formed in a block 23b attached to the base 24.

A stop 23c is provided at the upstream end of the slot and a further stop may be provided at the downstream end if required.

A pedestal 26 mounted on the base 24 contains two bearings 28 and a power turbine 30 having blades 31 and shaft 32 are mounted in an overhung manner in the bearings 28. The shaft 32 is arranged to be connected to a load (not shown) for example an electrical generator.

The central locating means 22 is provided to centralise expansion of the power turbine stator casing 16 relative to the rotor and to limit the radial movement of the casing 16 about the trunnion 20 thereby preventing interference between the blades 31 and the casing 16 and/or blades 17 as explained below.

When the power plant is assembled, the stator casing may be mounted initially without being attached to the gas generator. The casing 16 will pivot on the trunnion 20 and the stop 23c will prevent the casing from rotating too far and fouling the rotor blades. The stop may be mounted at the rear of the slot depending on which side of the trunnion 20 the centre of gravity of the casing 16 lies.

In operation the length of the link 18 can be adjusted to obtain the correct clearance between the blades 31 and the casing 16 and to allow for the expansion of the gas generator during running.

In an alternative arrangement, the link 18 can be removed and the gas generator can be supported at its upstream end by a pair of columns 40 and a cranked arm 42 which is pivotally attached at each end between the gas generator and each column.

I claim:

1. A gas turbine power plant including a gas generator and a power turbine, the stator portion of the power turbine being secured to the gas generator and the rotatable portion of the power turbine being mounted in support means which are independent of the gas generator and the stator portion of the power turbine, the power turbine stator portion being mounted for rotation about a horizontal axis on a pair of trunnions, one of said trunnions being mounted on each side of the power turbine stator portion, the upstream end of the gas generator being mounted on a movable support.

2. A power plant as claimed in claim 1 in which a central locating means is secured to the power turbine stator portion, the central locating means comprising a tongue engaging a slot in a member which is secured to the ground, a stop being provided at one end of the slot and so positioned as to allow the stator portion to move due to thermal expansion but to prevent fouling between the stator and rotor portions of the power turbine when the stator portion is disconnected from the gas generator.

3. A power plant as claimed in claim 1 in which the upstream support of the gas generator comprises a pair of columns, one on each side of the gas generator and an arm pivotally attached at each end between the gas generator and each column.